United States Patent [19]
Dull et al.

[11] Patent Number: 5,593,633
[45] Date of Patent: Jan. 14, 1997

[54] EDGE AND SURFACE BREATHER FOR HIGH TEMPERATURE COMPOSITE PROCESSING

[76] Inventors: Kenneth M. Dull, 3017 Deer Island Dr., Sumner, Wash. 98390; Terry L. Schneider, 24156 Falconer Dr., Murrieta, Calif. 92362

[21] Appl. No.: 518,363

[22] Filed: May 3, 1990

[51] Int. Cl.⁶ .................................................. B29D 9/00
[52] U.S. Cl. ...................... 264/510; 264/316; 264/257; 156/81; 156/87; 156/285; 156/326; 156/331.1
[58] Field of Search ............................ 156/81, 87, 155, 156/276, 285, 326, 308.2, 331.3; 428/113, 738; 264/35, 511, 571, 102, 510, 316

[56] References Cited

U.S. PATENT DOCUMENTS

| | | | |
|---|---|---|---|
| 1,934,772 | 11/1933 | Sheets | 156/104 |
| 3,703,422 | 11/1972 | Yoshino | 156/87 |
| 3,810,815 | 5/1974 | Welhart et al. | 428/412 |
| 4,217,157 | 8/1980 | Stoltze et al. | 156/87 |
| 4,267,147 | 5/1981 | Pogoda et al. | 264/571 |
| 4,323,623 | 4/1982 | Ahrens et al. | 428/246 |
| 4,622,091 | 11/1986 | Letterman | 156/286 |
| 4,676,853 | 6/1987 | Lerma | 156/87 |
| 4,765,942 | 8/1988 | Christensen et al. | 264/510 |
| 4,851,280 | 7/1989 | Gupta | 428/246 |
| 4,853,172 | 8/1989 | Jacaruso et al. | 264/571 |
| 4,915,896 | 4/1990 | Rachal | 264/511 |
| 4,942,013 | 7/1990 | Palmer et al. | 264/511 |
| 4,944,824 | 7/1990 | Gupta | 156/286 |
| 4,963,215 | 10/1990 | Ayers | 156/286 |
| 4,983,341 | 1/1991 | Kromrey | 264/102 |

*Primary Examiner*—Ngoclan Mai
*Attorney, Agent, or Firm*—Elizabeth F. Harasek

[57] ABSTRACT

A novel method of forming high strength, fiber reinforced, high temperature thermoplastic panels is provided which entails placing at least one layer of metal mesh or screen adjacent the vacuum probes in a vacuum bagging apparatus. Additionally, caul plates are placed as needed around the thermoplastic workpiece and metal mesh is positioned on the plates to promote uniform vacuum drawing on the entire panel and complete consolidation.

8 Claims, 1 Drawing Sheet

EDGE AND SURFACE BREATHER FOR HIGH TEMPERATURE COMPOSITE PROCESSING

This invention was made and conceived in connection with work done under government contract numbers F33615-82-C-3213 and/or PE63211F-69CW-01-60.

This invention relates to an improved method of vacuum forming fiber reinforced, high temperature thermoplastics using metal mesh edge and surface breathers.

BACKGROUND

A well known method of forming thermoplastic polymers involves placing a sheet of resin over a male tool, placing a vacuum impervious layer or bag over the sheet and tool, sealing the edges of the bag, heating the thermoplastic to a temperature above its glass transition temperature, drawing a vacuum through the tool or vacuum ports to pull the sheet onto the tool, and cooling the assembly to fix the shape of the formed thermoplastic sheet.

In order to fully form a sheet by this method, it is necessary that a vacuum can be pulled continuously through the bag on both the tool and bag sides of the sheet to be formed. In the past, this has been accomplished by pulling a vacuum through small orifices in the tool and/or interposing one or more layers of fiberglass between the bag or tool and the sheet to be molded. An example of such a method is shown in U.S. Pat. No. 3,703,422 which describes the manufacture of honeycomb panels by gluing polyimide face sheets onto honeycomb core. A breather layer of glass or metal mesh, coated with a non-stick release agent, is provided above and below the laminate. U.S. Pat. No. 3,810,815 shows interleafing a metal mesh strip between layers of polyacrylic and polycarbonate sheet to make clear laminated windows for aircraft. The sheet becomes embedded in the laminated panels and is cut off as scrap.

This invention relates particularly to bonding fiber-reinforced, high temperature thermoplastic preforms by a vacuum bagging method to achieve structural panels without the use of adhesives. We found that prior art methods of vacuum bagging high temperature thermoplastics were unsuccessful because the breather layer would deteriorate at the temperatures needed to fuse preforms and layups of reinforced thermoplastic. In particular, coatings on the breathers would themselves fuse and prevent uniform vacuum over the entire panel during the forming process and cool down.

BRIEF SUMMARY OF THE INVENTION

A novel method of forming high strength, fiber reinforced, high temperature thermoplastic panels is provided which entails placing at least one layer of metal mesh or metal screen adjacent the vacuum orifice in a vacuum bagging apparatus. Additionally, caul plates may be placed as needed around the thermoplastic workpiece and metal mesh is positioned on the plates. The metal mesh breathers do not bond to the finished panel and may be reused. They promote uniform vacuum draw on entire panel and uniform bonding and consolidation due to melting and cooling of the thermoplastic. Use of the metal mesh breathers also maintains the integrity of and prevents damage to fiber fillers, such as graphite fiber.

Our invention will be better understood in terms of the figures and the following detailed description.

DETAILED DESCRIPTION OF THE INVENTION

Figure 1:
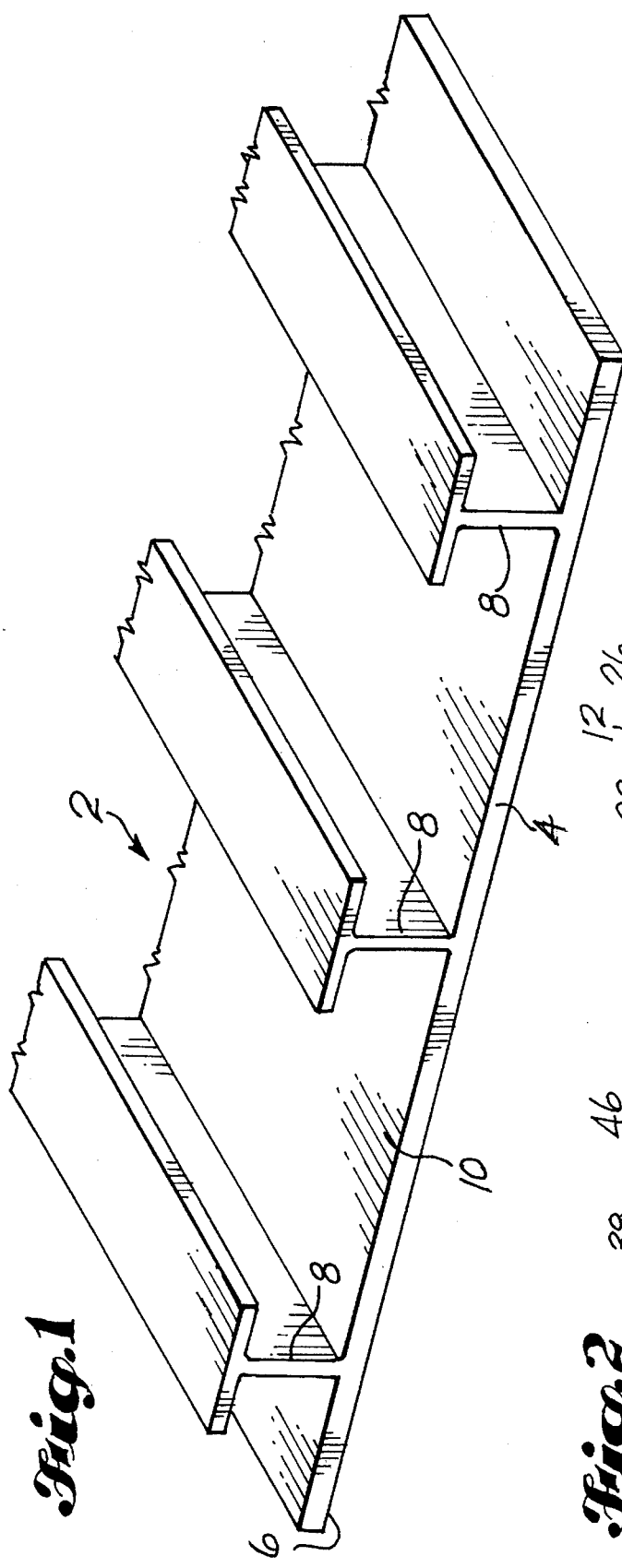
FIG. 1 is a perspective view of a three stringer, graphite fiber reinforced polyether ether ketone (PEEK) panel molded in accordance with the invention.

In accordance with a preferred embodiment and referring to FIG. 1, a structural panel 2 is shown which comprises a base 4 having a flat side 6. Three I-beam shaped stringers 8 are integral to the back side 10 of base 4. Panels having the configuration of FIG. 1 have been molded from graphite fiber filled PEEK and polyamide imide resins, for example. Structural panels such as 2 have exceptionally high strength and good bonding between the resin and filler constituents. These physical properties are brought about, at least in part, by the uniform vacuum application during final consolidation and cooling which is made possible by use of the subject invention.

Figure 2:
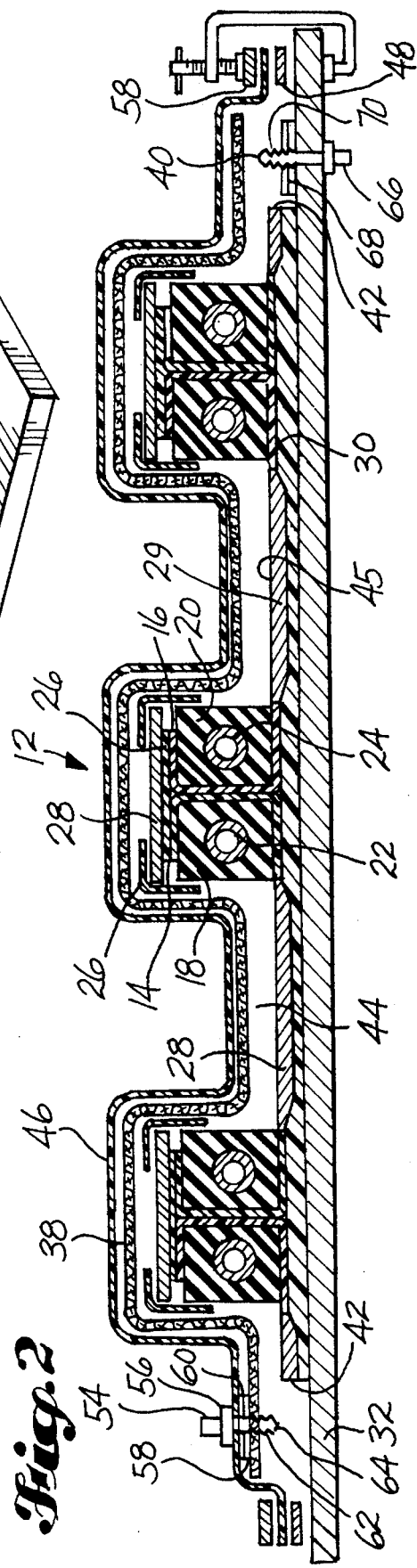
FIG. 2 is an exploded side sectional view of a vacuum bagging arrangement for the panel of FIG. 1 showing preformed stringer segments, stringer segment inserts, caul plates, vacuum bag, fiberglass breather and metal mesh breathers in accordance with the invention.

Referring to FIG. 2, a vacuum bag molding apparatus 12 is shown which is suitable for practicing a preferred embodiment of the invention. Apparatus 12 is shown preparatory to molding a panel like that shown in FIG. 1. I-beams 8 are consolidated from two preformed, U-shaped channels 14 and 16 which lie back-to-back during the bagging process. Heat resistant, hard rubber blocks 18 and 20 with reinforcing pipe inserts 22 and 24 are located in channels 14 and 16 to prevent them from changing shape during high temperature stage of the molding. An additional layer 26 of reinforced resin is laid on top of channels 14 and 16. Caul strips 28 and 29 of metal with beveled edges are laid between layups for I-beams 8 and along the edges of panel 2. A bed 30 of tacked segments of fiber reinforced, thermoplastic resin tape is located under I-beam structures 8 and laminates 28. A parting film or release agent (not shown) may be used on the resin surfaces to prevent contact with caul plates or other surfaces.

The entire layup for panel 2 is positioned on smooth metal bottom caul plate 32. The corners of the I-beam layups are covered with a tape of vacuum impervious film 36. A plurality of layers of fiberglass cloth 38 are laid over the panel layup. Cloth 38 is the primary breather for the vacuum molding process.

Several thicknesses of metal screen or mesh 40 are positioned around the edges 42 of the layup for panel 2. Strips 44 and 45 of several layers of metal mesh are located between the layups for I-beams 8. Vacuum bag 46 is draped over the entire laminate. Bag 46 is vacuum sealed with respect to caul plate 32 by means of sealant strip 48 along the entire perimeter of bag 46. Sealant strip 48 is compressed and sealed by pressure exerted on fairing bar 50 by a plurality of C-clamps 52.

Through-bag vacuum probe 54 has wide flange 56 on the outside of bag 46 and washer 58 on the other side to prevent tearing and leaking of bag 46. Washer 58 is held in place by a threaded washer 60 which is screwed onto threaded nozzle 62. A hole is cut in breather 38 so that nozzle 62 extends through and nozzle outlet 64 lies directly adjacent metal mesh breather 40. This detail is critical to the invention because, in prior art practices, fiberglass breathers like 38 would partially or wholly seal during high temperature vacuum forming of fiber reinforced thermoplastics and prevent a uniform vacuum application on the part.

A second vacuum probe 66 extends through caul plate 32. Probe 66 is sealed with respect to plate 32 to prevent leaks. It is secured to plate 32 by threaded washer 68 screwed onto threaded nozzle tip 70. Vacuum outlet 72 of probe 66 also lies directly adjacent edge screen 40 to prevent seal-off of breather 38. We have found that so long as a layer of metal screen or mesh is interposed between a fiberglass breather and the vacuum probe, the fiberglass does not seal-off even under conditions of high temperature and vacuum.

In vacuum bagging, the caul plates determine the shape of the thermoplastic next to them. That is, the flat bottom caul 32 shapes the top of the panel of FIG. 1, caul shims 34, the top of the I-beams and caul shims 28 the back of the panel. We have also discovered that putting additional metal mesh such as 44 and 45 between one or more of the caul plates, in cooperation with the fiberglass breathers, improves uniform vacuum over the whole panel during molding. The metal mesh breathers do not bond to any other component, can be easily removed after vacuum bagging and are reusable.

This invention has particular application to molding structural panels from high strength fibers which have been impregnated with engineering thermoplastics having high glass transition and forming temperatures. By structural panels herein is meant a panel, with or without integral reinforcing stringers or bosses, which are capable of use as load-bearing structures. The composites which are useful in the practice of this invention are commonly known as prepregs which are widely used in the aircraft industry.

Examples of fibers which may be used in such prepregs are aramid, carbon, glass, boron, and polyester. Suitable impregnating resins include PEEK, poly(ether ketone), polyphenylene sulfide, polyarylates, fluoroplastics, polyimides, polyamides and poly(amideimides). The preferred resins have glass transition or melting temperatures above about 500° F. (260° C.) and preferably above 650° F. (343° C.). The fiber in prepregs many be straight, woven or twisted strand, chopped or cut strand, woven cloth or mat depending on the end application. Prepregs may be purchased from many different suppliers. A typical prepreg used in the aircraft industry comprises a tape of graphite fiber having an areal weight of about 145 g/m$^2$ and a resin content of about 30 weight percent.

We experienced good results using ordinary ⅛ inch mesh woven steel hardware cloth for the metal mesh breathers. Any metal with a high enough melting or anealing temperature would be suitable. Smaller mesh screens may be preferable for small or oddly shaped areas. The mesh may be in woven, expanded metal, metal wool or other forms so long as it has a pattern of continuous voids through which a vacuum can be drawn and it does not collapse appreciably during the vacuum molding process.

In order to form a structural panel in accordance with this invention, a vacuum bagging assembly like that shown in FIG. 2 is made. The Assembly is disposed in a heating apparatus such as an autoclave. A positive pressure can be maintained in the autoclave to assist vacuum molding.

A vacuum is pulled through the vacuum probes and the prepreg or composite is heated to a temperature above its glass transition temperature. The thermoplastic becomes pliable and is fully densified in the planned shape as the bag is evacuated. The metal mesh adjacent the vacuum probes and the cauls assures that the consolidating vacuum is available to the entire part. This promotes panel manufacture without voids or damage to reinforcing fibers. For most engineering resins, best results are achieved if the part is slowly cooled from the forming temperature while maintaining a vacuum in the bag.

EXAMPLE

A three stringer panel like that shown in FIG. 1 was formed in a vacuum bagging apparatus substantially as shown in FIG. 2.

The material used to make the panel was a graphite fiber tape reinforced with PEEK resin that is sold by ICI Americas, Inc. The PEEK is a thermoplastic which is solid at room temperature so the tape has no tack. The tape had a resin content of 32±2 percent, an areal weight of 145 grams per square meter and a nominal thickness of 5.6 thousandths of an inch. It was provided in widths of 5.5 to 8.5 inches. The tape was tacked together preliminary to forming using a soldering iron to melt the resin, joining the pieces while the resin was still soft and cooling. The channels, top tape layers and the top portions of the panel were consolidated in an autoclave from tape layups. The channels were formed from flat pieces consolidated in a compression press.

All detail laminates and the top of the panel were hand laid up and tack seamed together with a soldering iron. The bottom caul plate was made of smooth steel. The hard rubber blocks were inserted in the channel pieces. Steel caul plates were located over the layup. Folded ⅛" mesh hardware cloth was laid between channels and around the perimeter of the layup. Six layers of fiberglass cloth were laid on top of this assembly. The vacuum bag was a 2 mil thick polyimide film. It was held in place with a steel fairing bar over a high temperature sealant strip. The strip was deformed and sealed by applying uniform pressure around the bag with C-clamps. One vacuum probe was inserted through the lower caul plate and the other through the vacuum bag. Outlets of both probes were located immediately adjacent the hardware cloth edge breather. This entailed cutting a hole through the fiberglass layers adjacent the probe in the vacuum bag.

The assembly was evacuated and placed in an autoclave. The autoclave was pressurized to 130 psi and a vacuum of at least 22 inches of mercury was pulled through the probes. The assembly was heated to a temperature of about 740° F. (393° C.) at a rate of about 3–5° F. (1–3° C.) per minute. The temperature and pressure were maintained for about 30 minutes. The pressure in the autoclave was increased to about 200 psi and it was cooled at a rate of 3–5° F. (1–3° C.) per minute above 300° F. (149° C.) and about 18° F. (9° C.) per minute below. The panel was examined by through transmission ultrasonic inspection. The examination showed complete bonding between all tape segments and no voids or unacceptable variations were found in the panel. The hardware cloth breathers did not fuse with any other part of the apparatus and were reused. No such results were obtained for panels made in like manner without the metal mesh breathers.

While my invention has been described in terms of specific embodiments thereof, other forms may be readily adapted by one skilled in the art. Accordingly, the scope of our invention is to be limited only in accordance with the following claims.

We claim:

1. A method of vacuum forming fiber reinforced thermoplastic having a glass transition or melting temperature of at least about 260° C. comprising the steps of laying up one or more pieces of said fiber reinforced thermoplastic of suitable size and shape; stabilizing the positions of said pieces as necessary preparatory to forming; placing one or more caul plates in shape determining relation with said thermoplastic; laying metal mesh adjacent at least one said caul plates; covering all said components with a vacuum-tight bag; sealing said bag; positioning vacuum probes in said sealed bag such that their outlets are adjacent said metal mesh; and heating said bag and its contents to a temperature above the glass transition or melting temperature of said thermoplastic; and drawing a vacuum through the vacuum probes, said metal mesh providing uniform vacuum draw over the thermoplastic and promoting complete consolidation thereof in the desired shape.

2. A method of vacuum forming prepreg tape wherein the resin in said tape has a glass transition or melting temperature of at least about 260° C. comprising the steps of laying up one or more pieces of said prepreg tape of suitable size and shape; stabilizing the positions of said tape by tacking them together preparatory to forming; placing one or more caul plates in shape determining relation with said tape; laying metal mesh adjacent at least one said caul plate and around the perimeter of said laid up tape; providing a fabric breather over said pieces; covering all said components with a vacuum-tight bag; sealing said bag; positioning vacuum probes in said sealed bag such that their outlets are adjacent said metal mesh; and heating said bag and its contents to a temperature above the glass transition or melting temperature of said resin in said prepreg tape; and drawing a vacuum through the vacuum probes, said metal mesh providing uniform vacuum draw over the thermoplastic and promoting complete consolidation thereof in the desired shape.

3. The method of claim 1 where the thermoplastic is one or more selected from the group consisting of polyether ether ketone, poly(ether ketone), polyphenylene sulfide, polyarylates, fluoroplastics, polyimides, polyamides and poly(amideimides).

4. The method of claim 2 where the resin in the prepreg is one or more selected from the group consisting of polyether ether ketone, poly(ether ketone), polyphenylene sulfide, polyarylates, fluoroplastics, polyimides, polyamides and poly(amideimides).

5. The method of claim 1 where the reinforcing fiber in the thermoplastic is carbon fiber.

6. The method of claim 2 where the fiber in the prepreg is carbon fiber.

7. The method of claim 1 where the thermoplastic comprises polyether ether ketone and the reinforcing fiber comprises graphite.

8. The method of claim 2 where the prepreg tape comprises graphite fibers and polyether ether ketone resin.

* * * * *